(12) United States Patent
Jang et al.

(10) Patent No.: US 9,212,688 B2
(45) Date of Patent: Dec. 15, 2015

(54) SNAP RING HAVING MULTIPLE ROLLERS

(71) Applicants: James Jang, Cypress, CA (US);
Ricardo Jang, Cypress, CA (US)

(72) Inventors: James Jang, Cypress, CA (US);
Ricardo Jang, Cypress, CA (US)

(*) Notice: Subject to any disclaimer, the term of this patent is extended or adjusted under 35 U.S.C. 154(b) by 180 days.

(21) Appl. No.: 14/064,723

(22) Filed: Oct. 28, 2013

(65) Prior Publication Data

US 2015/0113774 A1    Apr. 30, 2015

(51) Int. Cl.
*F16B 45/02*    (2006.01)
(52) U.S. Cl.
CPC ........... *F16B 45/02* (2013.01); *Y10T 24/45346* (2015.01)
(58) Field of Classification Search
None
See application file for complete search history.

(56) References Cited

U.S. PATENT DOCUMENTS

| 5,287,645 | A | * | 2/1994 | Gois | 43/14 |
| 5,505,012 | A | * | 4/1996 | Walker et al. | 36/134 |
| 7,624,483 | B1 | * | 12/2009 | Jang et al. | 24/599.1 |
| 2008/0104810 | A1 | * | 5/2008 | Liang | 24/600.2 |
| 2010/0180411 | A1 | * | 7/2010 | Jang | 24/596.1 |

* cited by examiner

*Primary Examiner* — Jack W Lavinder
(74) *Attorney, Agent, or Firm* — IPLA P.A.; James E. Bame (57) ABSTRACT

Disclosed herein is a snap ring which is configured such that pressure which is applied from a purse line to the snap ring or multiple rollers is distributed to two rollers rather than being focused on one roller. A first side part and a second side part of a frame are formed diagonally such that the purse line that is disposed on the first side roller or the second side roller is easily moved towards an intermediate roller along the first side part or the second side part. Thereby, pressure which is applied from the purse line to the snap ring or the multiple rollers can be evenly distributed to the first side roller and the intermediate roller or to the second side roller and the intermediate roller rather than being focused on only one roller. As a result, the lifetime of the snap ring can be increased.

14 Claims, 11 Drawing Sheets

SNAP RING HAVING MULTIPLE ROLLERS

BACKGROUND OF THE INVENTION

1. Field of the Invention

This Application Claims the benefit of priority to Korean Patent Application 10-2012-0097037 filed on Sep. 3, 2012. The present invention relates generally to snap rings having multiple rollers and, more particularly, to a snap ring having multiple rollers which is configured such that pressure which is applied from a purse line to the snap ring or the multiple rollers is distributed to two adjacent rollers rather than being focused on only one roller.

2. Description of the Related Art

Generally, purse seines are a kind of fishing net and are equipment used for fishing sardines, horse mackerels, mackerels, bonitos, tuna, etc. Such a purse seine and a conventional snap ring are illustrated in FIGS. 1 and 2.

Figure 1:
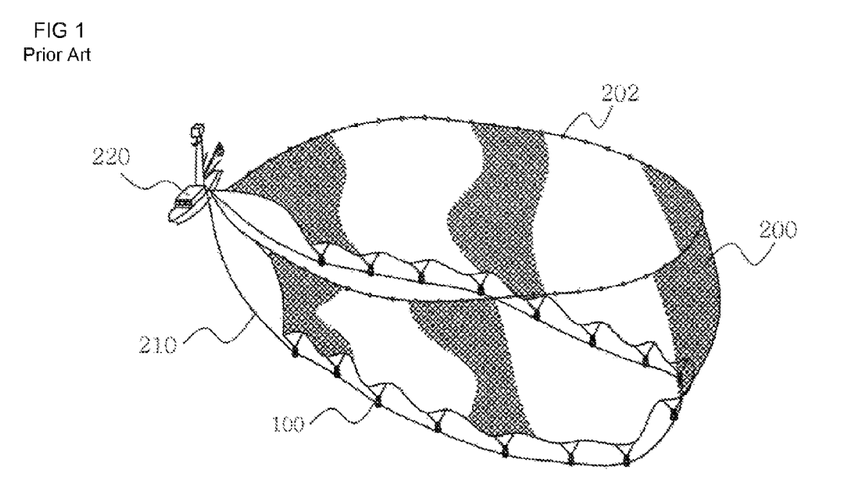
FIG. 1 is a perspective view illustrating a typical purse seine.
Figure 2:
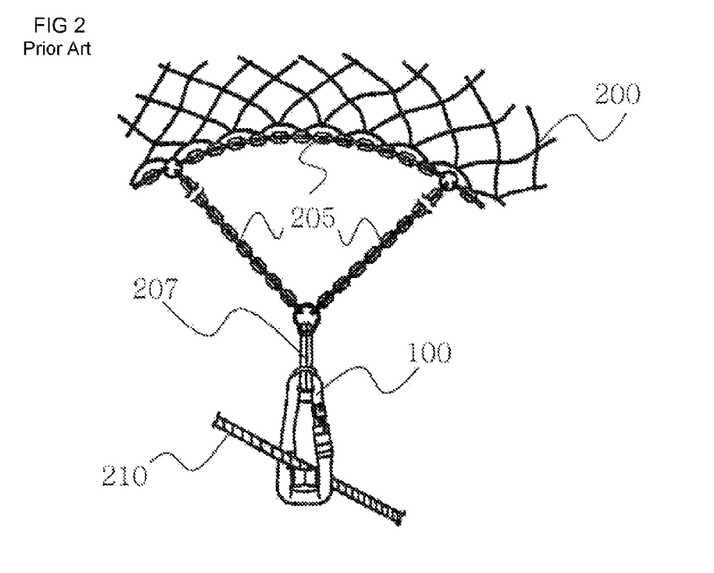
FIG. 2 is a perspective view showing a conventional snap ring.

As shown in FIGS. 1 and 2, a purse seine 200 has a rectangular shape, the central portion of which is slightly wider than other portions. Furthermore, a plurality of buoyancy units 202 are provided along the upper edge of the purse seine 200 in order to make it possible for the upper edge of the purse seine 200 to float on water, and bridle chains 205 are provided under the lower edge of the purse seine 200 so as to make it possible for the lower edge of the purse seine 200 to sink under the water surface. By virtue of the buoyancy units 202 and the bridle chains 205, the purse seine 200 can spread in the vertical direction in the water. Typically, the purse seine 200 is deployed in the water in an approximately circular shape so as to catch fish.

Furthermore, a purse line 210 which is used to haul in the purse seine 200 which has been deployed in a circular shape is disposed along the lower edge of the purse seine 200. The purse line 210 is coupled to the ends of the bridle chains 205 through connectors which are called snap rings 100. In detail, connection members 207 such as ropes or straps are connected to the ends of the bridle chains 205. Each connection member 207 is connected to a first end of the corresponding snap ring 100. The purse line 210 passes through second ends of the snap rings 140, thereby coupling the purse line 210 to the bridle chains 205. To haul in the purse seine 200, when the purse line 210 is pulled by a hydraulic purse winch provided on a fishing boat 220, the bridle chains 205 of the purse seine 200 are also pulled, and thus fish are confined while the purse seine 200 is hauled in.

However, in the case of the snap ring 100 according to the conventional technique, due to the weight of the fish and the purse seine 200 being hauled in, a relatively large frictional force is generated on the contact surface between the purse line 200 and the snap rings 100, thus inducing extreme abrasion of the surfaces of the purse line 210 and the snap rings 100, possibly resulting in tearing. This seriously interferes with the fishing operation. Furthermore, maintenance costs increase due to frequent replacement of the purse line 210 or the snap ring 100, thus resulting in reduced income.

Furthermore, because of the large load applied to each snap ring 100, the snap ring 100 may be broken. If the purse seine 200 is caught by the broken snap ring 100, the purse seine 200 may be entangled in the snap ring 100 or be torn by tidal currents or because of imbalance of the load, whereby a serious accident pertaining to the purse seine 200 may occur. As such, the operation of hauling in the purse seine 200 may not be smoothly carried out.

In an effort to overcome the above-mentioned problems, a snap ring having multiple rollers was proposed in Korean Patent Registration No. 10-0986008 (Date: Sep. 30, 2010) which was filed by the applicant of the present invention. The object of the snap ring having multiple rollers is to reduce frictional force generated on contact surfaces between a purse line and the snap ring.

Figure 3:
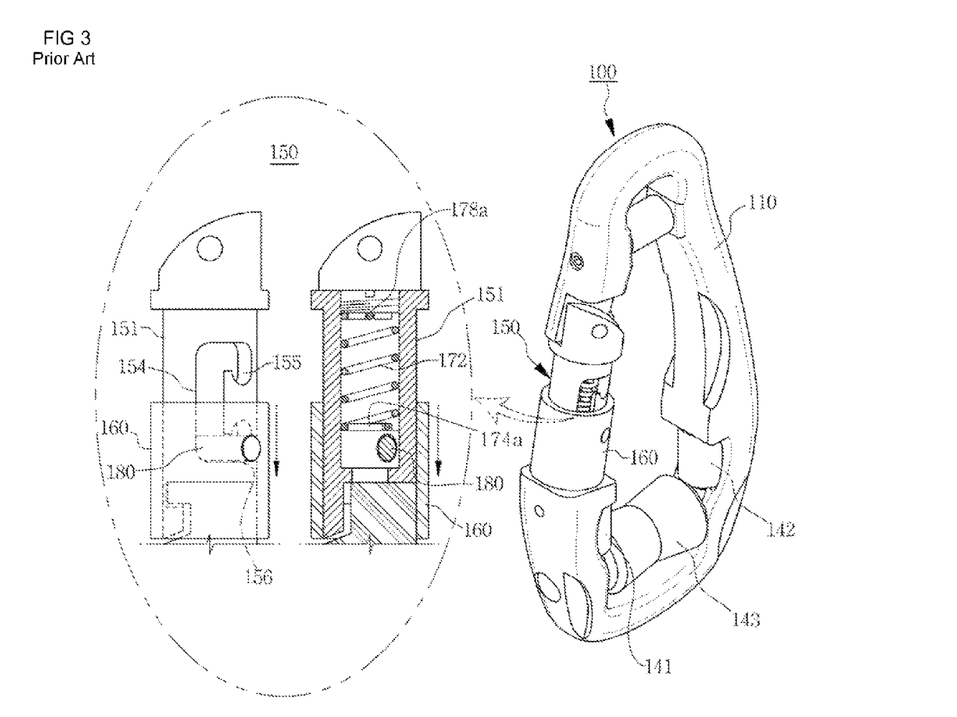
FIG. 3 illustrates a conventional snap ring having multiple rollers.

FIG. 3 illustrates the conventional snap ring having multiple rollers. Referring to FIG. 3, the snap ring 100 for coupling a purse line to a purse seine includes: a frame 110 which has a first end connected to the purse seine and a second end through which the purse line passes; and a plurality of rollers which are rotatably provided in the frame 100 at positions at which the purse line is brought into contact with the frame 100. The multiple rollers include first and second side rollers 141 and 142 which are disposed in opposite side parts of the frame 100, and an intermediate roller 143 which is provided to span the opposite side parts of the frame 110 and is oriented such that opposite ends thereof respectively face the first and second side rollers 141 and 142.

When the purse line is placed through the frame 110, the purse line is positioned such that a first side thereof is brought into contact with either the first side roller 141 or the second side roller 142, and a second side thereof is brought into contact with the intermediate roller 143. In this state, when the purse line is moved, the load of the purse line is distributed to two rollers, for example, the first side roller 141 and the intermediate roller 143, which make contact with the purse line. Further, friction between the purse line and the frame 110 can be reduced by rotation of the first side roller 141 and the intermediate roller 143.

Meanwhile, a ship used for fishing operations generally pitches and rolls very easily in response to conditions of the sea. The purse line connected to the ship is also easily moved forwards, backwards, leftwards or rightwards. In the conventional snap ring 100 having multiple rollers, the first side roller 141 and the intermediate roller 143 or the second side roller 142 and the intermediate roller 143 form a right angle. Thus, when the purse line is disposed on only the first side roller 141 or the second side roller 142, the purse line cannot smoothly slide towards the intermediate roller 143, and the hauling operation is carried out with the purse line being disposed on only the first side roller 141 or the second side roller 142. In this case, the load of the purse line is concentrated on only one portion, that is, the first or second side roller 141 or 142 on which the purse line is disposed, rather than being distributed to two portions, that is, to the first side roller 141 and the intermediate roller 143 or to the second side roller 142 and the intermediate roller 143.

Eventually, excessive pressure is applied to the snap ring 100, thus reducing the lifetime of the snap ring 100, thereby resulting in an increase in the replacement costs of the snap ring 100.

Furthermore, the conventional snap ring 100 further includes a locking unit 150 which is provided in the frame 110 to open or close a frame opening which is formed in the frame 110 to allow the purse line to be connected to the snap ring 100. The locking unit 150 includes a first cylinder 151 which is hinged at a first end thereof to a part of the frame that corresponds to a first end of the frame opening. A second end of the first cylinder is disposed in the frame 110 at a position corresponding to a second end of the frame opening. The locking unit 150 further includes a second cylinder 160 which slides along the first cylinder 151 to open or close the frame opening.

Furthermore, a guide slot 154 is longitudinally formed in a side surface of the first cylinder 151. A guide pin 180 which is fastened to the second cylinder 160 is moved along the guide slot 154. A first locking depression 155 and a second locking depression 156 are respectively formed in first and second ends of the guide slot 154. The guide pin 180 is locked to the first or second locking slot 155 or 156. While the guide pin 180 moves along the guide slot 154, the second cylinder 160 moves upwards or downwards and opens or closes the frame opening.

During the fishing operation, the operation of hauling in the purse seine must be rapidly carried out, and the operation of moving the second cylinder 160 to connect the snap ring 100 to the purse line must also be rapidly conducted. For this, a spring 172 is provided in the first cylinder 151 so that the second cylinder 160 can be automatically moved upwards or downwards. The guide pin 180 can be easily moved into and locked to the first locking depression 155 or the second locking depression 156 by contraction or extension and twisting of the spring 172. Thereby, the second cylinder 160 can be automatically moved upwards or downwards, thus facilitating the operation of opening or closing the frame 110.

However, to make the twisting of the spring 172 possible, for example, first and second coupling depressions 174a and 178a are required to fix opposite ends of the spring 172, so that the overall structure is complex. This increases the production cost. Furthermore, the twisting movement of the spring 72 deteriorates the elasticity of the spring 72, thereby increasing the replacement costs of the parts.

SUMMARY OF THE INVENTION

Accordingly, the present invention has been made keeping in mind the above problems occurring in the prior art, and an object of the present invention is to provide a snap ring having multiple rollers which is configured such that pressure which is applied from a purse line to the snap ring or the multiple rollers is evenly distributed to a first side roller and an intermediate roller or to a second side roller and the intermediate roller rather than being focused on only one roller, thus reducing the replacement cost of the parts.

Another object of the present invention is to provide a snap ring having multiple rollers which are configured such that an elastic part is not required to be twisted, thus increasing the durability of the elastic part.

In order to accomplish the above object, the present invention provides a snap ring, including: a frame comprising: a first side part; a second side part disposed facing the first side part and connected to the first side part; and a space defined between the first side part and the second side part so that a purse line is placed in the space; and multiple rollers comprising: an intermediate roller disposed in a lower end of the space to span a lower end of the first and a lower end of the second side part; a first side roller disposed above a first end of the intermediate roller, the first side roller extending along the first side part; and a second side roller disposed above a second end of the intermediate roller, the second side roller extending along the second side part, wherein a distance between the first side roller and the second side roller is reduced towards the lower end of the space.

Furthermore, a first roller receiving depression may be formed in a lower end of the first side part of the frame, and the first side roller is provided in the first roller receiving depression. A second roller receiving depression may be formed in a lower end of the second side part, and the second side roller is provided in the second roller receiving depression.

The first side roller, the second side roller and the intermediate roller may respectively have a first shaft, a second shaft and an intermediate shaft that function as axes of the corresponding rollers. The opposite ends of the intermediate shaft may be respectively disposed in the lower end of the first side part and the lower end of the second side part. A lower end of the first shaft and a lower end of the second shaft may respectively make contact with the opposite ends of the intermediate shaft, and an upper end of the first shaft and an upper end of the second shaft may be respectively inserted into a side surface of the first roller receiving depression and a side surface of the second roller receiving depression.

First fixing pins may be removably and respectively disposed in the lower end of the first side part and the lower end of the second side part through the intermediate shaft, and a second fixing pin may be removably disposed in a portion of the first side part through the first shaft.

In addition, a frame opening may be formed in the first side part. A through hole may be formed in the first side part from the frame opening to the first roller receiving depression, and the first shaft may be inserted into the first roller receiving depression through the through hole. The first shaft and a side portion of the intermediate shaft that faces the first shaft may be locked to each other, and the second shaft and the intermediate shaft that faces the second shaft may be locked to each other.

The snap ring may further include an auxiliary roller disposed in an upper end of the space to span the upper ends of the first and second side parts.

The snap ring may further include: a frame opening formed at a predetermined position in either the first side part or the second side part; and a locking unit openably closing the frame opening.

The locking unit may include: a first cylinder having a first end coupled by a hinge to a portion of the frame that corresponds to a first end of the frame opening, a second end facing a portion of the frame that corresponds to a second end of the frame opening; and a second cylinder movably fitted over the first cylinder, the second cylinder sliding along the first cylinder and opening or closing the frame opening.

Furthermore, a locking part may be provided on a second end of the first cylinder, and a coupling guide may be provided on the frame at a position facing a second end of the frame opening such that the locking part releasably engages with the coupling guide. When the first cylinder is rotated on the hinge and the second end of the first cylinder is disposed in the second end of the frame opening, the second cylinder may slide towards the second end of the frame opening and receives the coupling guide and the locking part. When the first cylinder is rotated on the hinge and the second end of the first cylinder is moved away from the second end of the frame opening, the second cylinder may slide towards the first end of the frame opening and releases the coupling guide and the locking part.

In addition, a guide slot may be formed in a side surface of the first cylinder in a longitudinal direction of the first cylinder, and a guide pin may be disposed in the guide slot and coupled to the second cylinder. The guide pin may move along the guide slot to move the second cylinder.

The guide slot may include: a first guide slot extending a predetermined length in the longitudinal direction of the first cylinder; and a second guide slot extending a predetermined length from a first end of the first guide slot that corresponds to the first end of the frame opening in a direction in which the second cylinder rotates on its own axis.

Further, a receiving space may be formed in the first cylinder, and the elastic unit may be disposed in the receiving space. The elastic unit may include: an elastic part having a first end supported by the first cylinder in a first end of the receiving space that faces the first end of the first cylinder, and a second end disposed in a second end of the receiving space; and a movable part disposed on a second end of the elastic part, with a receiving hole formed in the movable part so that the guide pin is disposed in the receiving hole. When the guide pin moves from the second guide slot and enters the first end of the first guide slot, the guide pin may be automatically moved along the first guide slot towards a second end of the first guide slot by elastic force of the elastic part. When the guide pin moves from the first guide slot and enters an end of the second guide slot, the guide pin may be pushed to the end of the second guide slot by the elastic force of the elastic part so that the guide pin is prevented from being moved towards the first guide slot. The first guide slot may be slanted with respect to the longitudinal direction of the first cylinder.

Furthermore, a stop portion may be formed in the end of the second guide slot, the stop portion being concave towards the second end of the first cylinder, and when the guide pin is disposed in the end of the second guide slot, the guide pin may be locked to the stop portion by the elastic force of the elastic part.

In addition, a fixing portion may be formed in the second end of the first guide slot and be concave such that the fixing portion encircles a circumference of the guide pin. When the guide pin is disposed in the second end of the first guide slot, the guide pin may be fixed in place by the fixing portion without being moved leftwards or rightwards.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a snap ring having multiple rollers according to a preferred embodiment of the present invention will be described in detail with reference to the attached drawings.

Figure 4:
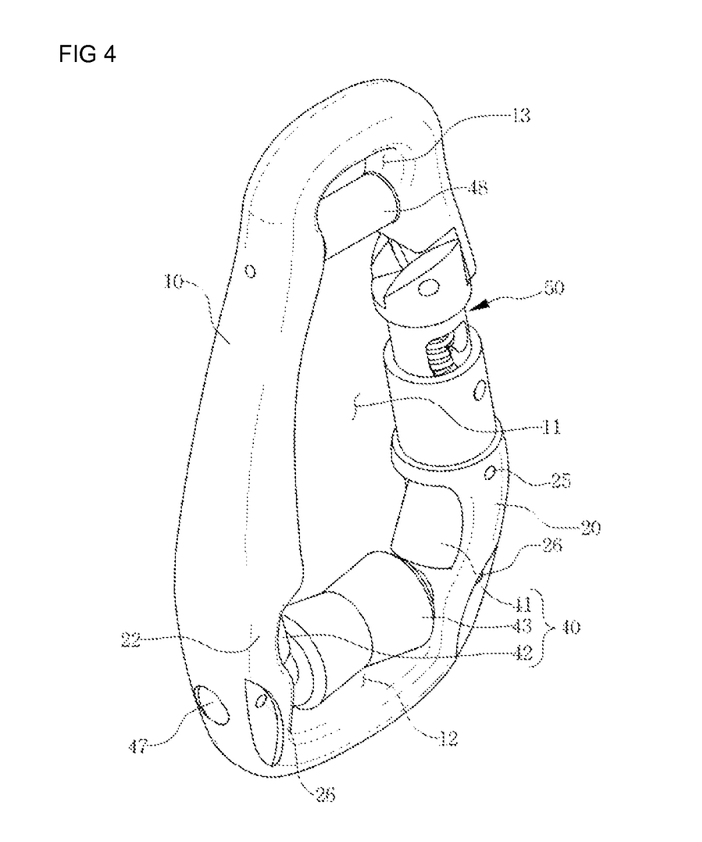
FIG. 4 is a view illustrating a snap ring having multiple rollers, according to a preferred embodiment of the present invention.

FIG. 4 is a view illustrating the snap ring having multiple rollers according to the preferred embodiment of the present invention. Referring to FIG. 4, the snap ring according to the preferred embodiment of the present invention is used to connect a purse seine (not shown) to a purse line (not shown) when performing commercial fishing. The snap ring includes a frame 10, a locking unit 50, multiple rollers 40 and an auxiliary roller 48.

The frame 10 includes a first side part 20 and a second side part 22 which face each other.

Preferably, the frame 10 has an elliptical shape such that the purse line can pass through the frame 10. Furthermore, the frame 10 may have a circular or polygonal shape, as long as the purse line can sufficiently pass through the frame 10. In detail, the frame 10 includes the first side part 20 which extends a predetermined length, the second side part 22 which is disposed facing the first side part 20 and is connected to the first side part 20, and space which is defined between the first side part 20 and the second side part 22. The space includes a first space 11, a second space 12 and a third space 13. The first, second and third spaces 11, 12 and 13 are not independent spaces but are spaces that are defined by partitioning an integrated single space based on the purpose of use.

The first space 11 is a hollow space, which is defined in a central portion of the frame 10 to allow the purse line to pass through the frame 10. The purse line is disposed in the frame 10 through the first space 11 such that the purse line is brought into contact with the multiple rollers 40 which will be explained later. The second space 12 is a hollow space, which is defined between the intermediate roller 43 and a lower end of the frame 10 by the installation of the third roller 43 in the frame 10. By virtue of the second space 12, the third roller 43 can be smoothly rotated.

The third space 13 is a hollow space into which a connection member (not shown) such as a rope which is coupled to one end of a bridle chain connected to the purse seine is inserted when the connection member is coupled to an upper end of the frame 10. The third space 13 is defined between the auxiliary roller 48 which will be described later herein and an inner surface of the upper end of the frame 10. As such, the connection member is disposed in the frame 10 through the third space 13.

The locking unit 50 functions to open or close the first space 11 of the frame 10, and this will be explained in detail later herein.

The multiple rollers 40 serve to reduce frictional force which is generated at contact surfaces between the purse line and the snap ring by the weight of the fish and the purse seine being hauled in when a hydraulic purse winch pulls the purse line to land fish caught in the purse seine. The intermediate roller 43, the first side roller 41 and the second side roller 42 are disposed at positions at which the purse line makes contact with the inner surface of the frame 10 when the purse line is placed in the inner surface of the lower end of the frame 10 through the first space 11.

The intermediate roller 43 is provided in the lower end of the frame 10 in such a way that the intermediate roller 43 spans the lower ends of the first and second side parts 20 and 22 of the frame 10. The first side roller 41 extends a predetermined length along the first side part 20 and is disposed above a first end of the intermediate roller 43. The second side roller 42 extends a predetermined length along the second side part 22 and is disposed above a second end of the intermediate roller 43. As a result, the opposite ends of the intermediate roller 43 are respectively oriented towards the first side roller 41 and the second side roller 42.

The distance between the first side roller 41 and the second side roller 42 is defined such that the width of the first space 11 is reduced towards a lower end of the first space 11. For this, the lower ends of the first and second side parts 20 and 22 are oriented diagonally in such a way that the distance therebetween is increased from the bottom to the top. Therefore, the purse line which is disposed on the first side roller 41 or the second side roller 42 can smoothly slide towards the intermediate roller 43 along the first side part 20 or the second side part 22 that are oriented diagonally. The load of the purse line can be reliably distributed to two rollers, that is, to the first side roller 41 and the intermediate roller 43 or to the second side roller 42 and the intermediate roller 43. As such, pressure the purse line applies to the snap ring or the multiple rollers 40 is distributed to two portions, whereby the lifetime of the snap ring can be extended, thus reducing the replacement cost thereof.

The auxiliary roller 48 is disposed in the upper end of the frame 10 in a lateral direction to span the opposite side parts of the inner surface of the upper end of the frame 10. The third space 13 is defined between the inner surface of the upper end of the frame 10 and the auxiliary roller 48. When the connection member (not shown) that is coupled to the purse seine is connected to the upper end of the frame 10, the connection member can be easily inserted into the third space 13, thus facilitating the operation of connecting the connection member to the upper end of the frame 10. The auxiliary roller 48 makes contact at an upper portion thereof with the connection member and rotates, thus reducing frictional force between the frame and the connection member. This provides the effect of extending the lifetime of the connection member. Furthermore, the auxiliary roller 48 is configured such that when the purse seine is deployed along the purse line the auxiliary roller 48 is brought into contact with the purse line that passes through the frame 10 and is rotated, thus reducing frictional force between the purse line and the frame 10, thereby reducing the replacement costs of the parts.

Meanwhile, although the preferred embodiment of the present invention has been illustrated as using four rollers, the present invention is not limited to this. As needed, the number of rollers and spaces may be changed.

Each of the rollers 41, 42 and 43 of the multiple rollers 40 may have a cylindrical shape or a bow tie or hourglass shape, which is reduced in diameter from the opposite ends thereof to the central portion. Preferably, each of the frame 10 and the multiple rollers 40 may be made of stainless steel or a galvanized alloy capable of withstanding force applied to the snap ring during fishing, or a corrosion-resistant alloy or a material having sufficient mechanical strength.

Figure 5:
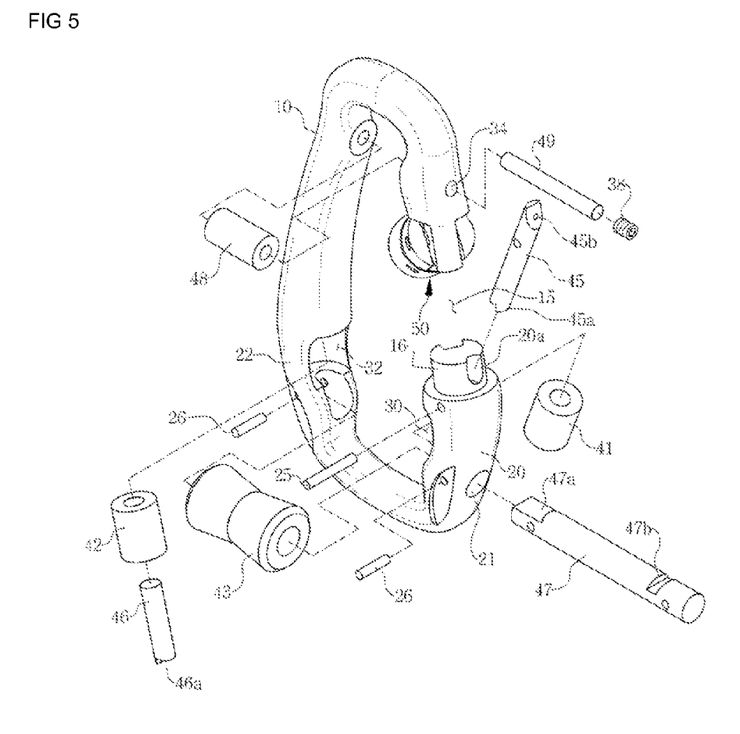
FIG. 5 is an exploded perspective view illustrating the snap ring according to the preferred embodiment of the present invention.
Figure 6:
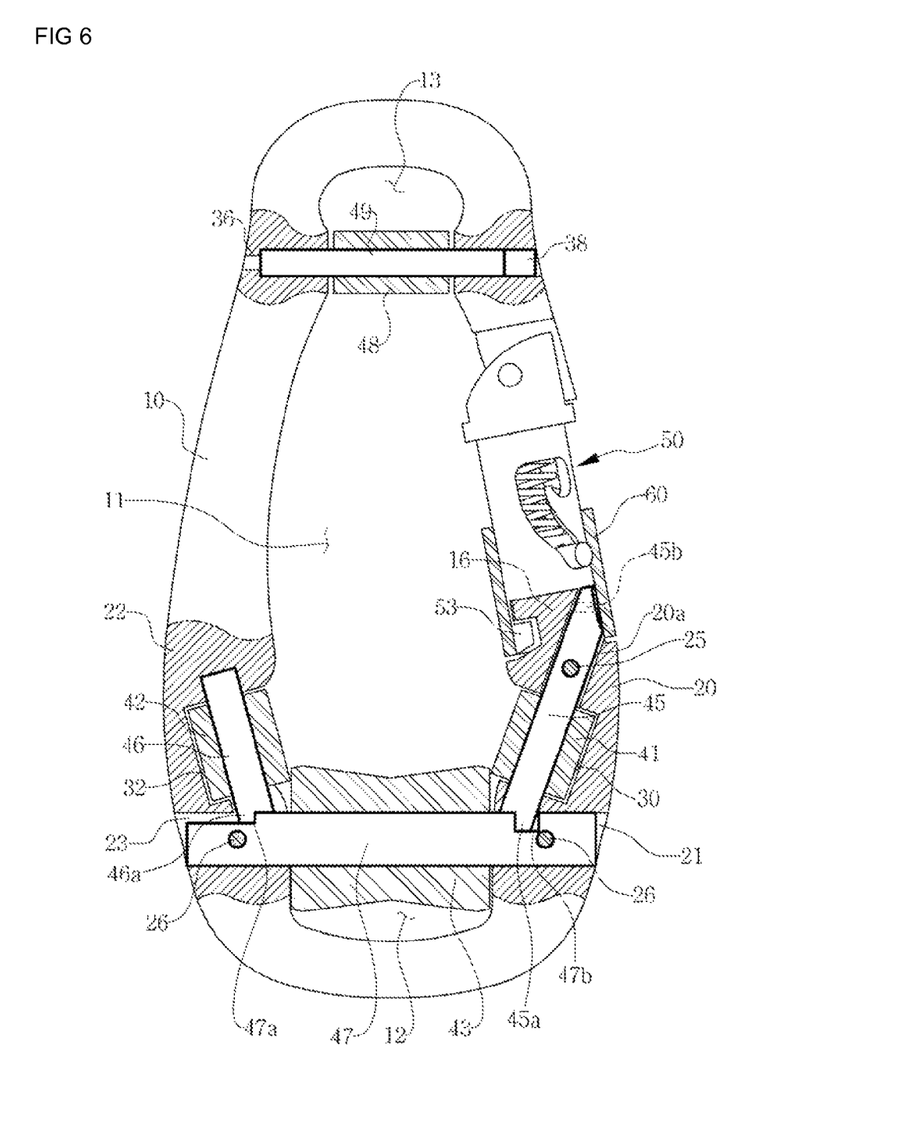
FIG. 6 is a sectional view illustrating the snap ring according to the preferred embodiment of the present invention.

FIG. 5 is an exploded perspective view illustrating the snap ring according to the preferred embodiment of the present invention. FIG. 6 is a sectional view illustrating the snap ring according to the preferred embodiment of the present invention; Referring to FIGS. 5 and 6, the snap ring according to the preferred embodiment of the present invention includes the first side roller 41, the second side roller 42, the intermediate roller 43 and the auxiliary roller 48.

The first side roller 41 is provided in the first side part 20 of the frame 10 to reduce the frictional force between the frame 10 and the purse line that is inserted into the first space 11 of the frame 10 and placed on the lower end of the inner surface of the frame 10. A first roller receiving depression 30 is formed in the lower end of the first side part 20 of the frame 10 so that the first side roller 41 can be provided in the first side part 20. A first shaft 45 which functions as a rotating axis for the first side roller 41 is installed in the first roller receiving depression 30. The first side roller 41 is rotatably fitted over the first shaft 45.

The first shaft 45 is inserted into the first roller receiving depression 30 through a through hole 20a which is formed in the first side part 20 from a frame opening 15, which is formed in the first side part 20 and will be explained later herein, towards the first roller receiving depression 30. A locking protrusion 45a is provided on a first end of the first shaft 45 so that the first shaft 45 is locked to an intermediate shaft 47 in such a way that the locking protrusion 45a is inserted into a locking depression 47b formed in the intermediate shaft 47. A second end of the first shaft 45 is disposed in the through hole 20a that communicates with the first roller receiving depression 30. A locking hole 45b is formed in the second end of the first shaft 45. The locking hole 45b is used to facilitate extraction of the first shaft 45 from the through hole 20a in such a way that a hook (not shown) or the like is inserted into the locking hole 45b.

A second fixing pin 25 is removably inserted into the first side part 20 and the first shaft 45 so that the first shaft 45 can be fixed in the first roller receiving depression 30 so as to be removable from the first roller receiving depression 30. The frame opening 15 is an open space which is formed above the first side part 20 so that the purse line can be inserted into the first space 11 of the frame 10 through the frame opening 15. The locking unit 50 opens or closes the frame opening 15. This will be explained in detail later herein.

The second side roller 42 is provided in the second side part 22 of the frame 10 to reduce the frictional force between the purse line and the frame 10. A second roller receiving depression 32 is formed in the lower end of the second side part 22 of the frame 10. A second shaft 46 which functions as a rotating axis for the second side roller 42 is disposed in the second roller receiving depression 32. The second side roller 42 is rotatably fitted over the second shaft 46. A first end of the second shaft 46 passes through a second insert hole 23 which will be explained later herein and comes into contact with the intermediate shaft 47. A second end of the second shaft 46 is inserted into a side surface of the second roller receiving depression 32.

A fixing protrusion 46a is provided on the end of the second shaft 46 that faces the intermediate shaft 47 and is locked to a stepped portion 47a of the intermediate shaft 47 which will be explained later herein. The intermediate shaft 47 is fixed with respect to one direction by the fixing protrusion 46a. This will be explained later herein.

The intermediate roller 43 is provided in the frame 10 in the lateral direction to span the first side part 20 and the second side part 22. For this, a first insert hole 21 and the second insert hole 23 are respectively formed in the lower end of the first side part 20 and the lower end of the second side part 22. The intermediate shaft 47 which functions as a rotating axis of the intermediate roller 43 is inserted into the first insert hole 21 and the second insert hole 23. The intermediate roller 43 is rotatably fitted over the intermediate shaft 47. Two first fixing pins 26 are removably and respectively provided in the end of the first side part 20 and the end of the second side part 22 through the intermediate shaft 47 so as to prevent the intermediate shaft 47 that is disposed in the first and second side parts 20 and 22 from being undesirably removed from the first or second side part 20 or 22.

The stepped portion 47a is formed on the end of the intermediate shaft 47 that faces the second shaft 46, and the fixing protrusion 46a of the second shaft 46 is locked to the stepped portion 47a. The stepped portion 47a is formed in the intermediate shaft 47 in such a way that a depression is formed in the corresponding end of the intermediate shaft 47. As a result, when the intermediate shaft 47 that has been disposed in the first and second side parts 20 and 22 is moved in a first direction, that is, from a depressed portion of the intermediate shaft 47 that is formed by the stepped portion 47a towards the other portion of the intermediate shaft 47, the intermediate shaft 47 can be easily moved without the stepped portion 47a being blocked by the fixing protrusion 46a of the second shaft 46. On the other hand, when the intermediate shaft 47 is moved in a second direction, that is, from the portion of the intermediate shaft 47 that is higher than the depressed portion thereof towards the depressed portion, the second end of the intermediate shaft 47 is blocked by the fixing protrusion 46a of the second shaft 46. In this case, the intermediate shaft 47 can no longer move. As such, the intermediate shaft 47 can move in one direction but cannot move in the other direction.

The auxiliary roller 48 is provided in the upper end of the frame 10 in a lateral direction to span the opposite side parts of the inner surface of the upper end of the frame 10. An auxiliary through hole 34 is formed in the upper ends of the first and second side parts 20 and 22 of the frame 10. An auxiliary shaft 49 which functions as a rotating axis of the auxiliary roller 48 is inserted into the auxiliary through hole 34. The auxiliary roller 48 is rotatably fitted over the auxiliary shaft 49.

A stop portion 36 is provided in a first end of the auxiliary through hole 34 so that a first end of the auxiliary shaft 49 is blocked by the stop portion 36. A removal prevention member 38 that has a cap shape is fitted into a second end of the auxiliary through hole 34 so as to prevent the auxiliary shaft 49 from being undesirably removed from the auxiliary through hole 34, whereby the auxiliary shaft 49 can be reliably fixed in the auxiliary through hole 34.

Figure 7:
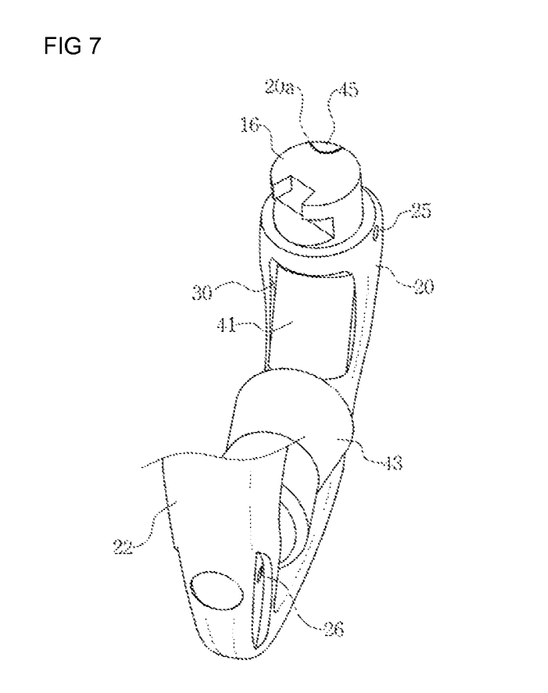
FIG. 7 is a view illustrating a process of opening the opening of the snap ring according to the preferred embodiment of the present invention.
Figure 8:
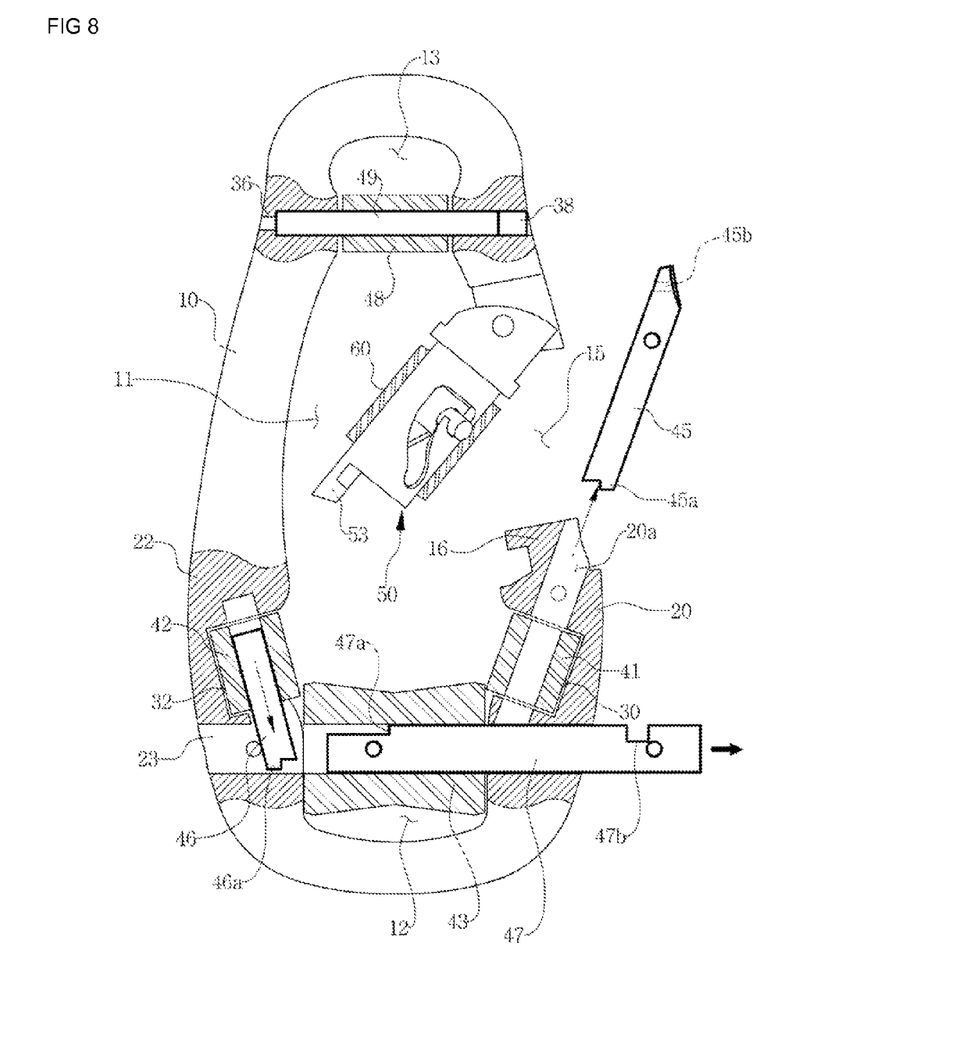
FIG. 8 is a view illustrating a process of disassembling the snap ring according to the preferred embodiment of the present invention.

FIG. 7 is a view illustrating a process of opening the opening of the snap ring according to the preferred embodiment of the present invention. FIG. 8 is a view illustrating a process of disassembling the snap ring according to the preferred embodiment of the present invention.

Referring to FIGS. 7 and 8, the snap ring according to the preferred embodiment of the present invention has a simple construction, so that it is easy to assemble and disassemble the snap ring. Hereinafter, the disassembly of the snap ring will be explained.

First, the locking unit 50 that closes the frame opening 15 is moved away from the frame opening 15 so that the frame opening 15 can be opened. Thereafter, the second fixing pin 25 and the first fixing pin 26 that respectively fix the first shaft 45 and the intermediate shaft 47 are removed from the frame 10. Subsequently, the first shaft 45 is moved outwards from the through hole 20a of the frame 10 until being completely removed from the frame 10. Here, the first shaft 45 can be easily extracted from the frame 10 in such a way that a hook (not shown) or the like is inserted into the locking hole 45b and then pulled outwards.

The intermediate shaft 47 is moved outwards from the first and second insert holes 21 and 23 of the frame 10 until it is completely removed from the frame 10. The first side roller 41 and the intermediate roller 43 are also removed from the frame 10. Thereafter, the first end of the second shaft 46 is moved towards the second insert hole 23 such that the second end of the second shaft 46 is removed from the side surface of the second roller receiving depression 32. In this state, the second shaft 46 and the second side roller 42 are removed from the second roller receiving depression 32.

As such, in the snap ring according to the preferred embodiment of the present invention, if the second fixing pin 25 and the first fixing pin 26 which have fixed the first shaft 45 and the intermediate shaft 47 to the frame 10 are removed from the frame 10, the intermediate roller 43, the first roller 41 and the second roller 42 can be successively removed from the frame 10. Consequently, the assembly process or the disassembly process can be facilitated, and the simplification of the assembly of the snap ring can reduce the production cost thereof. In addition, even if parts of the snap ring malfunction or become worn, replacing just the malfunctioning or worn parts with new ones can be easily performed.

Figure 9:
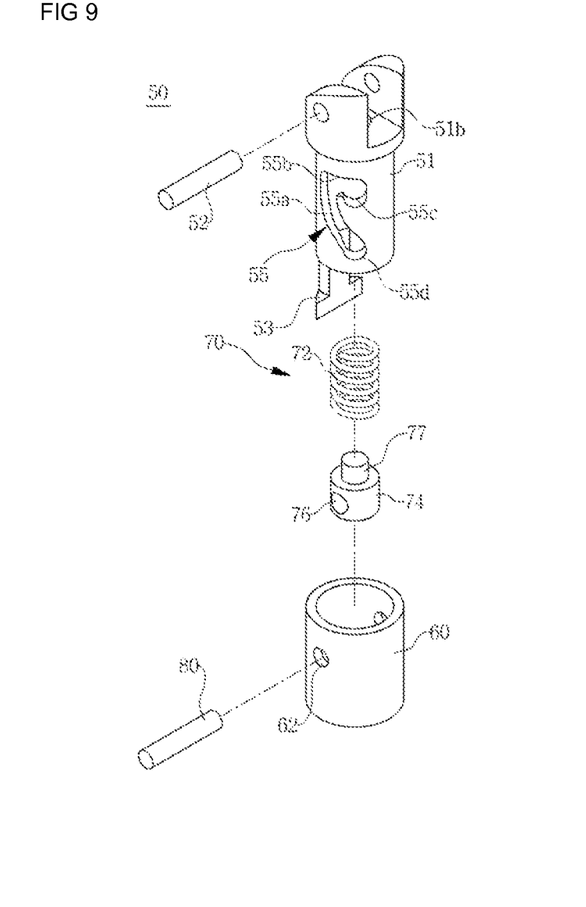
FIG. 9 is an exploded perspective view of a locking unit of the snap ring according to the preferred embodiment of the present invention.
Figure 10:
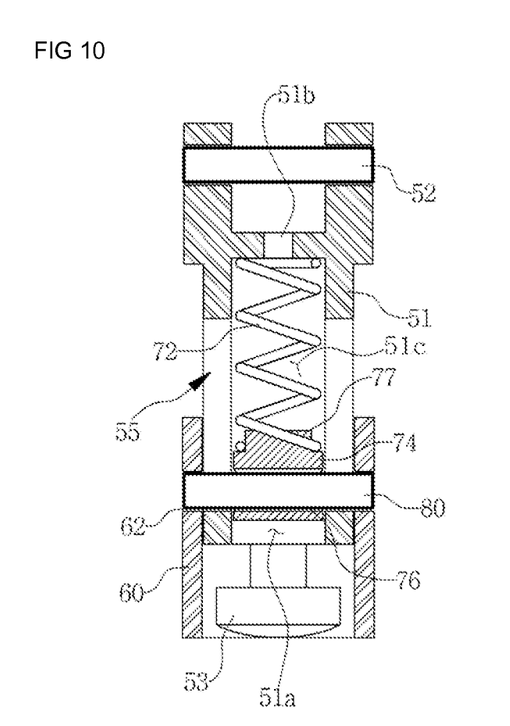
FIG. 10 is a sectional view of the locking unit of the snap ring according to the preferred embodiment of the present invention.

FIG. 9 is an exploded perspective view of the locking unit of the snap ring according to the preferred embodiment of the present invention. FIG. 10 is a sectional view of the locking unit of the snap ring according to the preferred embodiment of the present invention.

Referring to FIGS. 9 and 10, the locking unit 50 of the snap ring of the present invention is configured to open and close the frame opening 15 and includes a first cylinder 51, an elastic unit 70 and a second cylinder 60.

The first cylinder 51 is disposed in a first end of the frame opening 15. A first end of the first cylinder 51 is rotatably coupled by a hinge pin 52 to a portion of the frame 10, which corresponds to the first end of the frame opening 15. A locking part 53 protrudes from a second end of the first cylinder 51 and is coupled to a coupling guide (16: refer to FIG. 8) provided on a second end of the frame opening 15 of the frame 10.

To prevent the end of the first cylinder 51 from making contact with the second side part 22 when the first cylinder 51 that is hinged to the frame 10 rotates inwards in the frame 10, the first cylinder 51 is hinged to the frame 10 deliberately misaligned at a predetermined angle with respect to the second side part 22.

The locking part 53 protrudes from the second end of the first cylinder 51 towards the second end of the frame opening 15. A front end of the locking part 53 extends in both directions. The coupling guide 16 is provided on the frame 10 at a position corresponding to the second end of the frame opening 15, so that when the first cylinder 51 is rotated and disposed in the frame opening 15, the locking part 53 is inserted into the coupling guide 16 and engages with it. In this state, the locking part 53 that engages with the coupling guide 16 is maintained in the state of being locked to the coupling guide 16 unless the first cylinder 51 is rotated on the hinge.

Furthermore, a guide slot 55 is longitudinally formed in a side surface of the first cylinder 51. A guide pin 80 is placed in the guide slot 55 in a direction perpendicular to the longitudinal direction of the guide slot 55 so as to be movable along the guide slot 55. The guide slot 55 includes a first guide slot 55a which extends a predetermined length in the longitudinal direction of the first cylinder 51, and a second guide slot 55b which extends a predetermined length from a first end of the first guide slot 55a that corresponds to the first end of the frame opening 15 in a direction in which the second cylinder 60 which will be explained later herein rotates on its own axis. The first guide slot 55a may be oriented in a direction parallel to the longitudinal direction of the first cylinder 51. Alternatively, the first guide slot 55a may be slanted with respect to the longitudinal direction of the first cylinder 51. An end of the second guide slot 55b and a second end of the first guide slot 55a may be disposed on the same line parallel to the longitudinal direction of the first cylinder 51.

A stop portion 55c which is concave towards the second end of the first cylinder 51 is formed in the end of the second guide slot 55b so that when the guide pin 80 is disposed in the end of the second guide slot 55b, the guide pin 80 is locked to the stop portion 55c by the elastic force of the elastic unit 72 which will be explained later herein. A fixing portion 55d is formed in the second end of the first guide slot 55a in a shape in which it encircles around the circumference of the guide pin 80. When the guide pin 80 which moves along the guide slot 55 is disposed in the fixing portion 55d, it can be maintained in place without moving to the left or right.

The first cylinder 51 has therein a receiving space 51c in which the elastic unit 70 which will be explained later herein is disposed. The receiving space 51c is a hollow space which is formed along the first cylinder 51 so that the elastic unit 70 is disposed in the first cylinder 51. An insert hole 51a is formed in the second end of the first cylinder 51 so that the elastic unit 70 can be inserted into the first cylinder 51 through the insert hole 51a. A drain hole 51b is formed in the first end of the first cylinder 51 so that water or the like which is drawn into the receiving space 51c through the guide slot 55 of the first cylinder 51 can be easily drained out of the first cylinder 51.

The elastic unit 70 is inserted into the receiving space 51c through the insert hole 51a of the first cylinder 51. The elastic unit 70 includes an elastic part 72 and a movable part 74 which are successively inserted into the receiving space 51c. The elastic part 72 is a compression spring, a coil spring or the like which has appropriate elasticity. A first end of the elastic part 72 makes close contact with the movable part 74, and a second end thereof makes close contact with the first end of the first cylinder 51. A receiving hole 76 into which the guide pin 80 is inserted is formed in the movable part 74. The movable part 74 is disposed in the receiving space 51c of the first cylinder 51 so as to be movable in the receiving space 51c along the longitudinal direction. The cross-section of the movable part 74 is circular, and the receiving space 51c also has a circular cross-section so that the movable part 74 can smoothly rotate on its own axis in the receiving space 51c. A spring connection protrusion 77 protrudes from the movable part 74 at a position facing the elastic part 72, and the elastic part 72 is fitted over the spring connection protrusion 77.

The second cylinder 60 has a hollow cylindrical shape such that the first cylinder 51 is inserted into the second cylinder 60. When the first cylinder 51 rotates on the hinge and closes the frame opening 15, a first end of the second cylinder 60 slides along the first cylinder 51 towards the second end of the first cylinder 51. As a result, the second cylinder 60 receives therein the locking part 53 and the coupling guide 16 which are positioned at the second end of the first cylinder 51, thus preventing the locking part 53 that has been locked to the coupling guide 16 from being undesirably released from the coupling guide 16. Therefore, even if a large load is applied to the frame 10 by the weight of the purse seine and the purse line, because the locking part 53 and the coupling guide 16 are disposed in the second cylinder 60 and are reliably locked to each other, the frame opening 15 can be reliably maintained in the state of being closed by the locking unit 50.

Meanwhile, in order to realize the structure such that when the guide pin 80 moves along the guide slot 55 of the first cylinder 51 the second cylinder 60 can be towed and moved by the guide pin 80, a guide hole 62 is formed in the second cylinder 60, and the guide pin 80 is inserted into the second cylinder 60 through the guide hole 62.

The guide hole 62 is formed in the outer surface of the second cylinder 60 at a position corresponding to the guide pin 80 that is disposed at the stop portion 55c of the second guide slot 55b when the second cylinder 60 has moved to the first end of the first cylinder 51. The guide pin 80 is disposed in the outer surface of the second cylinder 60 through the guide hole 62.

Furthermore, when the guide pin 80 moves from the stop portion 55c of the second guide slot 55b to the end of the first guide slot 55a or from the end of the first guide slot 55a to the stop portion 55c of the second guide slot 55b, the second cylinder 60 is towed by the guide pin 80 and moved along the longitudinal direction of the first cylinder 51. Here, the second cylinder 60 rotates on its own axis and moves along the first guide slot 55a that is slanted with respect to the longitudinal direction of the first cylinder 51, thus opening or closing the frame opening 15. This will be explained in more detail with respect to FIGS. 11 and 12.

Figure 11:
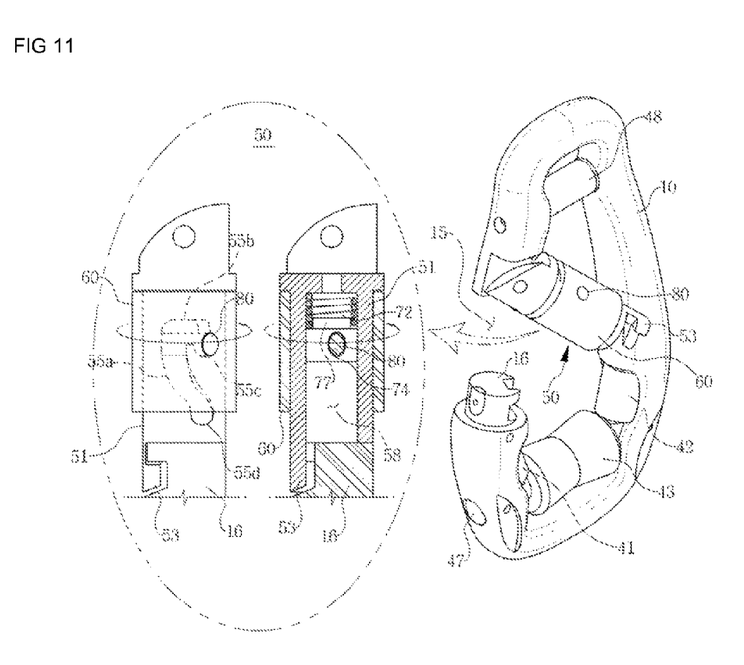
FIGS. 11 and 12 are views illustrating the opened state and the closed state of the locking unit of the snap ring according to the preferred embodiment of the present invention.
Figure 12:
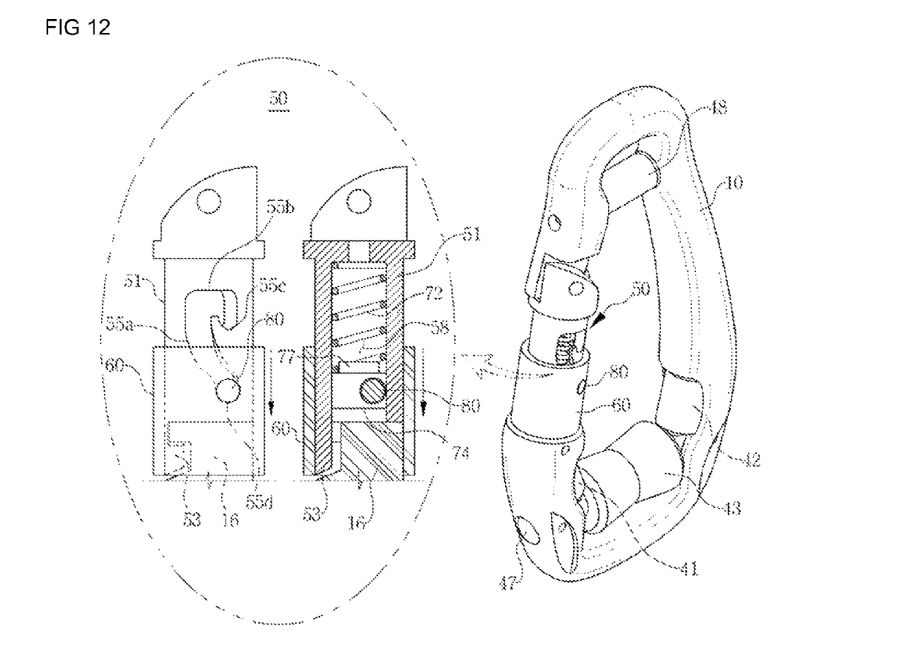

FIGS. 11 and 12 are respectively a perspective view and a partial section view illustrating the opened state and the closed state of the locking unit of the snap ring according to the preferred embodiment of the present invention.

FIG. 11 illustrates the opened state of the frame opening 15 of the frame 10. For this, the second cylinder 60 that has been disposed in the second end of the first cylinder 51 is moved towards the first end of the first cylinder 51 such that the guide pin 80 that has been in the end of the first guide slot 55a enters the stop portion 55c of the second guide slot 55b. Here, the guide pin 80 is pushed towards the stop portion 55c by the elastic force of the elastic part 72. Thereby, the guide pin 80 is not removed from the stop portion 55c unless a comparatively large external force is applied thereto.

As such, when the guide pin 80 is disposed in the stop portion 55c of the second guide slot 55b, the second cylinder 60 is positioned adjacent to the first end of the first cylinder 51, whereby the first end of the second cylinder 60 releases both the coupling guide 16 of the frame 10 and the locking part 53 of the first cylinder 51. As a result, the frame opening 15 of the frame 10 is opened.

Meanwhile, when the guide pin 80 enters the stop portion 55c of the second guide slot 55b from the first guide slot 55a, the second cylinder 60 that is coupled to the guide pin 80 rotates on its own axis along with the guide pin 80 and, simultaneously, the movable part 74 that is coupled to the guide pin 80 also rotates on its own axis along the guide pin 80. Because the elastic part 72 merely makes contact with the movable part 74 rather than being fixed to the movable part 74, the elastic part 72 is not twisted by the rotation of the movable part 74. In other words, the movable part 74 slides with respect to the end of the elastic part 72 while rotating on its own axis. As such, since the elastic part 72 is not twisted even when the movable part 74 rotates on its own axis, the durability of the elastic part 72 is increased, whereby the replacement cost of the parts can be reduced. Furthermore, because a separate coupling means for coupling the movable part 74 to the elastic part 72 is not required, the production cost can be reduced.

FIG. 10 illustrates the closed state of the frame opening 15 of the frame 10. For this, the second cylinder 60 is reversely rotated on its own axis. Then, the guide pin 80 that has been in the stop portion 55c of the second guide slot 55b is removed from the stop portion 55c and moved towards the first end of the first guide slot 55a. Thereafter, the guide pin 80 is automatically moved towards the second end of the first guide slot 55a by the elastic force of the elastic part 72 and then inserted into the fixing portion 55d. By virtue of the elastic force of the elastic part 72, the guide pin 80 can be prevented from being undesirably removed from the fixing portion 55d, unless a comparatively large external force is applied thereto. Further, when the guide pin 80 enters the fixing portion 55d, the second cylinder 60 is moved towards the second end of the guide slot 55 by the guide pin 80, and the end of the second cylinder 60 receives both the coupling guide 16 of the frame 10 and the locking part 53 of the first cylinder 51. Eventually, the frame opening 15 of the frame 10 is closed. In the same manner, because the elastic part 72 is not fixed to the movable part 74, when the movable part 74 rotates on its own axis or reversely rotates, the movable part 74 slides on the end of the elastic part 72. Therefore, the elastic part 72 can be prevented from being twisted by the movable part 74.

As such, the present invention is configured such that the elastic part 72 is prevented from being twisted when the second cylinder 60 moves along the first cylinder 51, whereby the durability of the elastic part 72 is increased, thus reducing the replacement cost of the parts.

Meanwhile, although the embodiment of the snap ring for connecting the purse line to the purse seine for fishing has been illustrated, the present invention is not limited to this embodiment. For instance, the snap ring of the present invention may be used in other fields, in which a thick rope or cable to which a heavy load is applied is used, in such a way that the rope or cable is disposed in the first space 11 of the frame 10 so that frictional force between the frame 10 and the rope or the frame 10 and the cable can be reduced.

As described above, in a snap ring having multiple rollers according to the present invention, at least one of a first side part and a second side part is oriented diagonally. Thus, when a purse line is disposed on the first side roller or the second side roller, the purse line easily slides towards the intermediate roller along the first side part or the second side part. Therefore, pressure which is applied from the purse line to the snap ring or the multiple rollers is distributed to a first side roller and an intermediate roller or to a second side roller and the intermediate roller rather than being focused on one roller. Thereby, the lifetime of the snap ring can be extended, and the replacement cost of the parts of the snap ring can also be reduced.

Furthermore, the snap ring according to the present invention is configured such that an elastic part is not fixed to a movable part. Therefore, even when the movable part is rotated with along with a guide pin, the elastic part is not twisted, whereby the durability of the elastic part can be increased. While the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A snap ring, comprising:
a frame comprising: a first side part; a second side part disposed facing the first side part and connected to the first side part; and a space defined between the first side part and the second side part so that a purse line is placed in the space; and
multiple rollers comprising: an intermediate roller disposed in a lower end of the space to span a lower end of the first side part and a lower end of the second side part; a first side roller disposed above a first end of the intermediate roller, the first side roller extending along the first side part; and a second side roller disposed above a second end of the intermediate roller, the second side roller extending along the second side part, wherein the lower ends of the first and second side parts are oriented diagonally in such a way that the distance therebetween is increased from a bottom end to a top end, and a distance between the first side roller and the second side roller is reduced towards the lower end of the space, so that the purse line disposed on the first side roller or the second side roller smoothly slides down towards the intermediate roller along the first side part or the second side part that are oriented diagonally.

2. The snap ring as set forth in claim 1, wherein
a first roller receiving depression is formed in a lower end of the first side part of the frame, and the first side roller is provided in the first roller receiving depression,
a second roller receiving depression is formed in a lower end of the second side part, and the second side roller is provided in the second roller receiving depression,
the first side roller, the second side roller and the intermediate roller respectively have a first shaft, a second shaft and an intermediate shaft that function as axes of the corresponding rollers,
opposite ends of the intermediate shaft are respectively disposed in the lower end of the first side part and the lower end of the second side part, and
a lower end of the first shaft and a lower end of the second shaft respectively make contact with the opposite ends of the intermediate shaft, and an upper end of the first shaft and an upper end of the second shaft are respectively inserted into a side surface of the first roller receiving depression and a side surface of the second roller receiving depression.

3. The snap ring as set forth in claim 2, wherein
first fixing pins are removably and respectively disposed in the lower end of the first side part and the lower end of the second side part through the intermediate shaft, and
a second fixing pin is removably disposed in a portion of the first side part through the first shaft.

4. The snap ring as set forth in claim 2, wherein
a frame opening is formed in the first side part, a through hole is formed in the first side part from the frame opening to the first roller receiving depression, and the first shaft is inserted into the first roller receiving depression through the through hole, and
the first shaft and a side portion of the intermediate shaft that faces the first shaft are locked to each other, and the second shaft and the intermediate shaft that faces the second shaft are locked to each other.

5. The snap ring as set forth in claim 1, further comprising:
an auxiliary roller disposed in an upper end of the space to span the upper ends of the first and second side parts.

6. The snap ring as set forth in claim 1, further comprising:
a frame opening formed at a predetermined position in either the first side part or the second side part; and
a locking unit openably closing the frame opening.

7. The snap ring as set forth in claim 6, wherein the locking unit comprises:
a first cylinder having a first end coupled by a hinge to a portion of the frame that corresponds to a first end of the frame opening, a second end facing a portion of the frame that corresponds to a second end of the frame opening; and a second cylinder movably fitted over the first cylinder, the second cylinder sliding along the first cylinder and opening or closing the frame opening.

8. The snap ring as set forth in claim 7, wherein
a locking part is provided on a second end of the first cylinder, and a coupling guide is provided on the frame at a position facing a second end of the frame opening such that the locking part releasably engages with the coupling guide,
when the first cylinder is rotated on the hinge and the second end of the first cylinder is disposed in the second end of the frame opening, the second cylinder slides towards the second end of the frame opening and receives the coupling guide and the locking part, and
when the first cylinder is rotated on the hinge and the second end of the first cylinder is moved away from the second end of the frame opening, the second cylinder slides towards the first end of the frame opening and releases the coupling guide and the locking part.

9. The snap ring as set forth in claim 7, wherein
a guide slot is formed in a side surface of the first cylinder in a longitudinal direction of the first cylinder, and a guide pin is disposed in the guide slot and coupled to the second cylinder,
wherein the guide pin moves along the guide slot to move the second cylinder.

10. The snap ring as set forth in claim 9, wherein the guide slot comprises:
a first guide slot extending a predetermined length in the longitudinal direction of the first cylinder; and
a second guide slot extending a predetermined length from a first end of the first guide slot that corresponds to the first end of the frame opening in a direction in which the second cylinder rotates on its own axis.

11. The snap ring as set forth in claim 10, wherein a receiving space is formed in the first cylinder, and an elastic unit is disposed in the receiving space,
the elastic unit comprises:
an elastic part having a first end supported by the first cylinder in a first end of the receiving space that faces the first end of the first cylinder, and a second end disposed in a second end of the receiving space; and
a movable part disposed on a second end of the elastic part, with a receiving hole formed in the movable part so that the guide pin is disposed in the receiving hole,
wherein when the guide pin moves from the second guide slot and enters the first end of the first guide slot, the guide pin is automatically moved along the first guide slot towards a second end of the first guide slot by elastic force of the elastic part, and when the guide pin moves from the first guide slot and enters an end of the second guide slot, the guide pin is pushed to the end of the second guide slot by the elastic force of the elastic part so that the guide pin is prevented from being moved towards the first guide slot.

12. The snap ring as set forth in claim 11, wherein the first guide slot is slanted with respect to the longitudinal direction of the first cylinder.

13. The snap ring as set forth in claim 11, wherein a stop portion is formed in the end of the second guide slot, the stop portion being concave towards the second end of the first cylinder, and
when the guide pin is disposed in the end of the second guide slot, the guide pin is locked to the stop portion by the elastic force of the elastic part.

14. The snap ring as set forth in claim 11, wherein a fixing portion is formed in the second end of the first guide slot and is concave such that the fixing portion encircles a circumference of the guide pin, and when the guide pin is disposed in the second end of the first guide slot, the guide pin is fixed in place by the fixing portion without being moved leftwards or rightwards.

* * * * *